(12) United States Patent
Mori

(10) Patent No.: US 10,809,100 B2
(45) Date of Patent: Oct. 20, 2020

(54) ELECTROMAGNETIC INDUCTION TYPE ENCODER

(71) Applicant: MITUTOYO CORPORATION, Kawasaki, Kanagawa (JP)

(72) Inventor: Hiroatsu Mori, Kanagawa (JP)

(73) Assignee: MITUTOYO CORPORATION, Kawasaki (JP)

(*) Notice: Subject to any disclaimer, the term of this patent is extended or adjusted under 35 U.S.C. 154(b) by 29 days.

(21) Appl. No.: 16/362,778

(22) Filed: Mar. 25, 2019

(65) Prior Publication Data

US 2019/0316936 A1  Oct. 17, 2019

(30) Foreign Application Priority Data

Apr. 13, 2018 (JP) ................... 2018-077297

(51) Int. Cl.
*G01D 5/20* (2006.01)
(52) U.S. Cl.
CPC ................... *G01D 5/2086* (2013.01)
(58) Field of Classification Search
CPC .................................................. G01D 5/2086
See application file for complete search history.

(56) References Cited

U.S. PATENT DOCUMENTS

| | | | |
|---|---|---|---|
| 6,005,387 A | 12/1999 | Andermo et al. | |
| 6,720,760 B2* | 4/2004 | Milvich | G01D 5/2086 324/207.17 |
| 9,877,042 B1* | 1/2018 | Jansson | G01D 5/2266 |
| 10,605,627 B2* | 3/2020 | Ishii | G01D 5/2053 |
| 2002/0030484 A1 | 3/2002 | Kiriyama et al. | |
| 2017/0241809 A1 | 8/2017 | Hubrich et al. | |

FOREIGN PATENT DOCUMENTS

| | | |
|---|---|---|
| EP | 2 851 655 | 3/2013 |
| JP | 10-318781 | 12/1998 |
| JP | 2001-255106 | 9/2001 |
| JP | 2004-309435 | 11/2004 |
| JP | 2015-059934 | 3/2015 |
| JP | 2016-206086 | 12/2016 |
| JP | 2017-532573 | 11/2017 |

\* cited by examiner

*Primary Examiner* — Reena Aurora
(74) *Attorney, Agent, or Firm* — Rankin, Hill & Clark LLP

(57) ABSTRACT

An electromagnetic induction type encoder, wherein a detection head has a drive coil generating magnetic flux, wherein a scale has a plurality of connection coils arrayed in a fundamental period λ in a measurement axis direction, are electromagnetically coupled with the magnetic flux generated by the drive coil and generates magnetic flux fluctuating in a predetermined spatial period in the measurement axis direction, wherein the detection head has a plurality of receiver coils arrayed in the fundamental period λ in the measurement axis direction and are electromagnetically coupled with the magnetic flux generated by the plurality of connection coils and detects a phase of the magnetic flux, wherein λ/2−2d<L<λ/2 is satisfied when a distance between line width centers of the plurality of connection coils is "L" and a line width of the plurality of connection coils is "d".

5 Claims, 13 Drawing Sheets

RECEIVER COIL

US 10,809,100 B2

ELECTROMAGNETIC INDUCTION TYPE ENCODER

CROSS-REFERENCE TO RELATED APPLICATION

This application is based upon and claims the benefit of priority of the prior Japanese Patent Application No. 2018-077297, filed on Apr. 13, 2018, the entire contents of which are incorporated herein by reference.

FIELD

A certain aspect of embodiments described herein relates to an electromagnetic induction type encoder.

BACKGROUND

There is known electromagnetic induction type encoders using electromagnetic connection between a detection head and a scale (for example, see Japanese Patent Application Publication No. H10-318781, Japanese Patent Application Publication No. 2001-255106, and Japanese Patent Application Publication No. 2016-206086). When a current flows in a drive coil of the detection head, magnetic flux is generated. Thus, connection coils of the scale generate an electromotive current. Next, receiver coils of the detection head generate an electromotive current, because of the magnetic flux generated by the electromotive current of the connection coils. Each electromagnetic connection between coils fluctuates in accordance with a relative displacement amount between the detection head and the scale. Thereby, a sine wave signal having the same pitch as that of the connection coils is obtained. When the sine wave signal is electrically interpolated, it is possible to use the sine wave signal as a digital amount of a minimum resolution. Moreover, it is possible to measure the relative displacement amount of the detection head.

SUMMARY

It is thought that a line width of the connection coils is widened in order to secure signal intensity in the electromagnetic induction type encoders. However, when the line width of the connection coils is widened, interpolation accuracy may be degraded and measurement accuracy may be degraded.

In one aspect of the present invention, it is an object to provide an electromagnetic induction type encoder that is capable of achieving both high measurement accuracy and securement of signal intensity.

According to an aspect of the present invention, there is provided an electromagnetic induction type encoder including: a detection head that has a rectangular shape; and a scale that has a rectangular shape, wherein the detection head faces with the scale and is configured to relatively move with respect to the scale in a measurement axis direction, wherein the detection head has a drive coil configured to generate magnetic flux, wherein the scale has a plurality of connection coils that are arrayed in a fundamental period $\lambda$ in the measurement axis direction, are configured to be electromagnetically coupled with the magnetic flux generated by the drive coil and generate magnetic flux that fluctuates in a predetermined spatial period in the measurement axis direction, wherein the detection head has a plurality of receiver coils that are arrayed in the fundamental period $\lambda$ in the measurement axis direction and are configured to be electromagnetically coupled with the magnetic flux generated by the plurality of connection coils and detect a phase of the magnetic flux, wherein $\lambda/2-2d<L<\lambda/2$ is satisfied when a distance between a line width center and another line width center of the plurality of connection coils in the measurement axis direction is "L" and a line width of the plurality of connection coils is "d".

DESCRIPTION OF EMBODIMENTS

The following is a description of embodiments, with reference to the accompanying drawings.

Figure 1A:
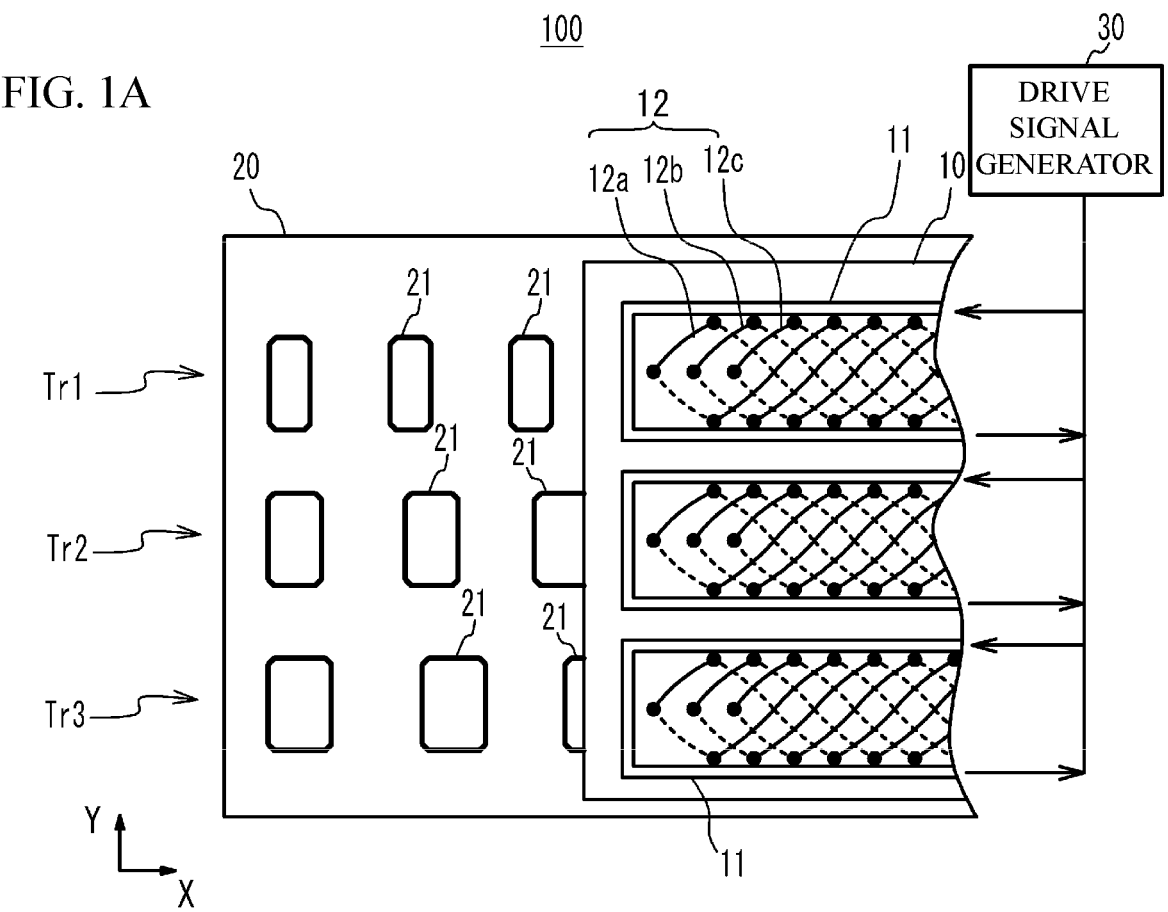
FIG. 1A illustrates a structure of an electromagnetic induction type encoder.
Figure 1B:
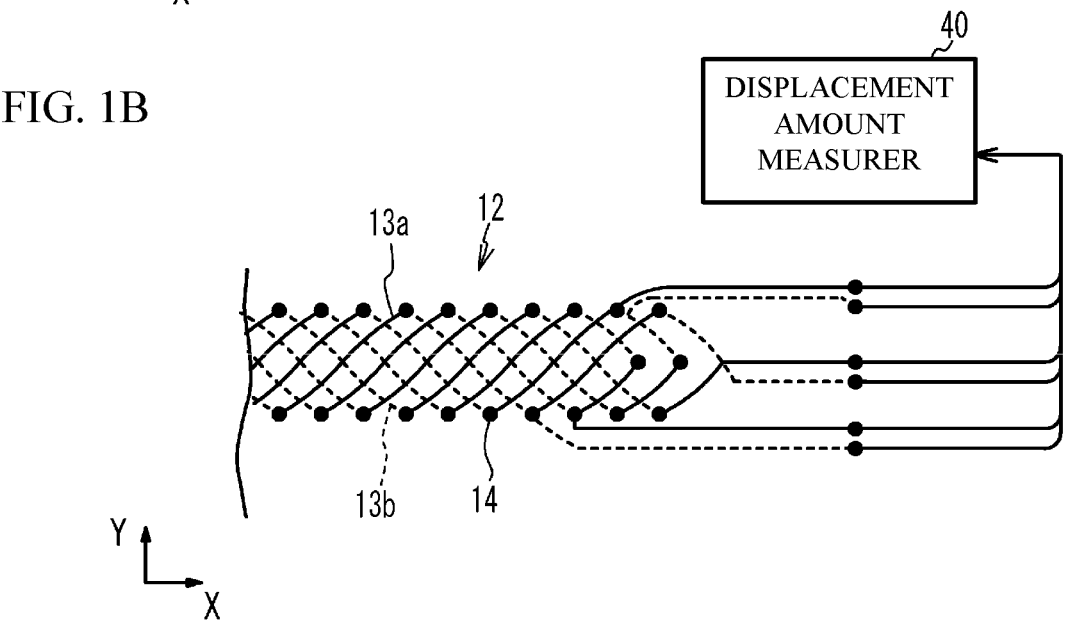
FIG. 1B illustrates receiver coils.

FIG. 1A illustrates a structure of an electromagnetic induction type encoder 100 using electromagnetic connection between a detection head and a scale. FIG. 1B illustrates receiver coils described later.

The electromagnetic induction type encoder 100 has a detection head 10 and a scale 20. The detection head 10 relatively moves in a measurement axis direction with respect to the scale 20. The detection head 10 and the scale 20 have a flat plate shape and face with each other through a predetermined gap. The electromagnetic induction type encoder 100 has a drive signal generator 30 and a displacement amount measurer 40 and so on. In FIG. 1A and FIG. 1B, X-axis indicates a displacement direction of the detection head 10 (measurement axis). Y-axis is vertical to the X-axis in a plane formed by the scale 20.

The detection head 10 has a drive coil 11, receiver coils 12 and so on. The drive coil 11 is a rectangular coil of which a longitudinal direction is the X-axis. As illustrated in FIG. 1B, the receiver coils 12 form a detection loop repeated in a fundamental period $\lambda$ of the detection head 10 in the X-axis direction, by positive sine wave patterns and negative sine wave patterns of the fundamental period a, that are formed by two patterns 13a and 13b formed on both faces of the detection head 10 and through wirings 14 connecting the pattern 13a and the pattern 13b, inside of the drive coil 11. In the embodiment, for example, the receiver coils 12 include three-phase receiver coils 12a to 12c of which a spatial phase is shifted to each other in the X-axis direction. The receiver coils 12a to 12c are connected through a star connection.

In the scale 20, a plurality of connection coils 21 having a rectangular shape are arrayed in the fundamental period λ along the X-axis. Each of connection coils 21 is a closed loop coil. The connection coils 21 is electromagnetically coupled with the drive coil 11 and is also electromagnetically coupled with the receiver coil 12.

The drive signal generator 30 generates a drive signal of a single phase AC and supplies the generated drive signal to the drive coil 11. In this case, magnetic flux is generated in the drive coil 11. Thus, an electromotive current is generated in the plurality of connection coils 21. The plurality of connection coils 21 are electromagnetically coupled with the magnetic flux generated by the drive coil 11 and generate magnetic flux fluctuating in the X-axis direction in a predetermined spatial period. The magnetic flux generated by the connection coils 21 generates an electromotive current in the receiver coils 12a to 12c. The electromagnetic coupling among each coil fluctuates in accordance with the displacement amount of the detection head 10. Thereby, a sine wave signal of the same period as the fundamental period λ is obtained. Therefore, the receiver coil 12 detects a phase of the magnetic flux generated by the plurality of connection coils 21. The displacement amount measurer 40 can use the sine wave signal as a digital amount of a minimum resolution by electrically interpolating the sine wave signal. Thereby, the displacement amount measurer 40 measures the displacement amount of the detection head 10.

One track is structured by the drive coils 11, the receiver coils 12 and the connection coils 21 that are electromagnetically coupled with each other. In the embodiment, the electromagnetic induction type encoder 100 has a plurality of tracks Tr1 to Tr3. The plurality of tracks Tr1 to Tr3 are arrayed at a predetermined interval in the Y-axis direction. Fundamental periods λ are different from each other in the tracks Tr1 to Tr3. Thus, the electromagnetic induction type encoder 100 acts as an absolute type encoder.

Figure 2A:
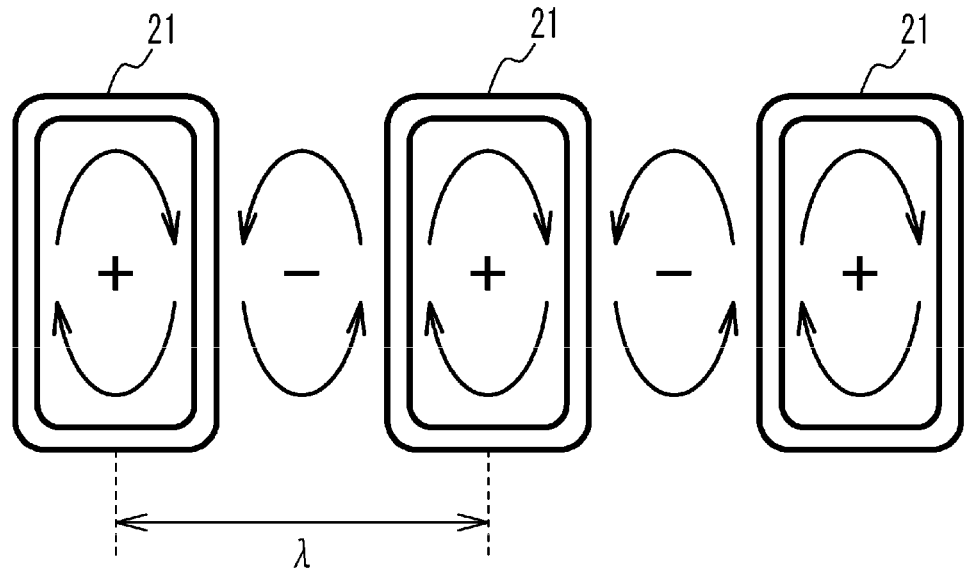
FIG. 2A illustrates magnetic field between connection coils next to each other.
Figure 2B:
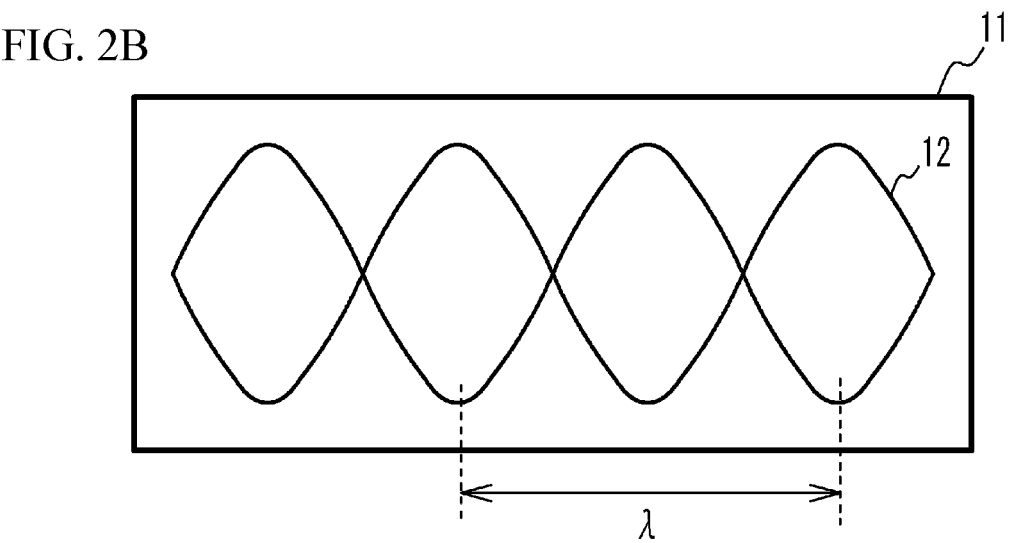
FIG. 2B illustrates a fundamental period of receiver coils.
Figure 2C:
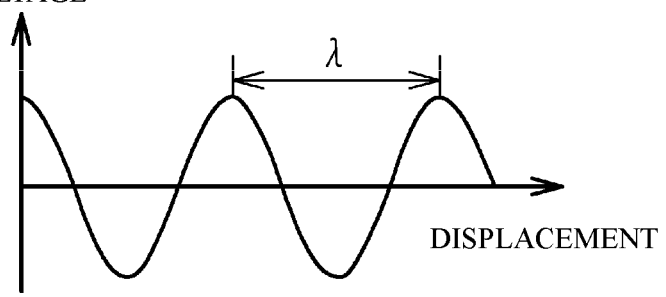
FIG. 2C illustrates an output signal of a reception signal.

FIG. 2A illustrates magnetic field between the connection coils 21 next to each other. As illustrated in FIG. 2A, a magnetic field is generated between the connection coils 21 next to each other. A direction of the magnetic field between the connection coils 21 is opposite to a direction of a magnetic field inside of the connection coils 21. The connection coils 21 are arrayed in the fundamental period λ, as mentioned above. As illustrated in FIG. 2B, the receiver coils 12a to 12c are also arrayed in the fundamental period λ. Thus, as illustrated in FIG. 2C, each of output signals of the receiver coils 12a to 12c is a sine wave signal of which a period is the fundamental period λ. The fundamental period a, is a distance between centers of the connection coils 21 next to each other in the X-axis direction. In other words, the fundamental period λ is a distance between a plus side edge in the X-axis of one of the connection coils 21 to a plus side edge in the X-axis of another connection coil 21 next to the one. The fundamental period a, of the receiver coils 12 is a period of sine wave patterns structuring the receiver coils 12.

Figure 3:
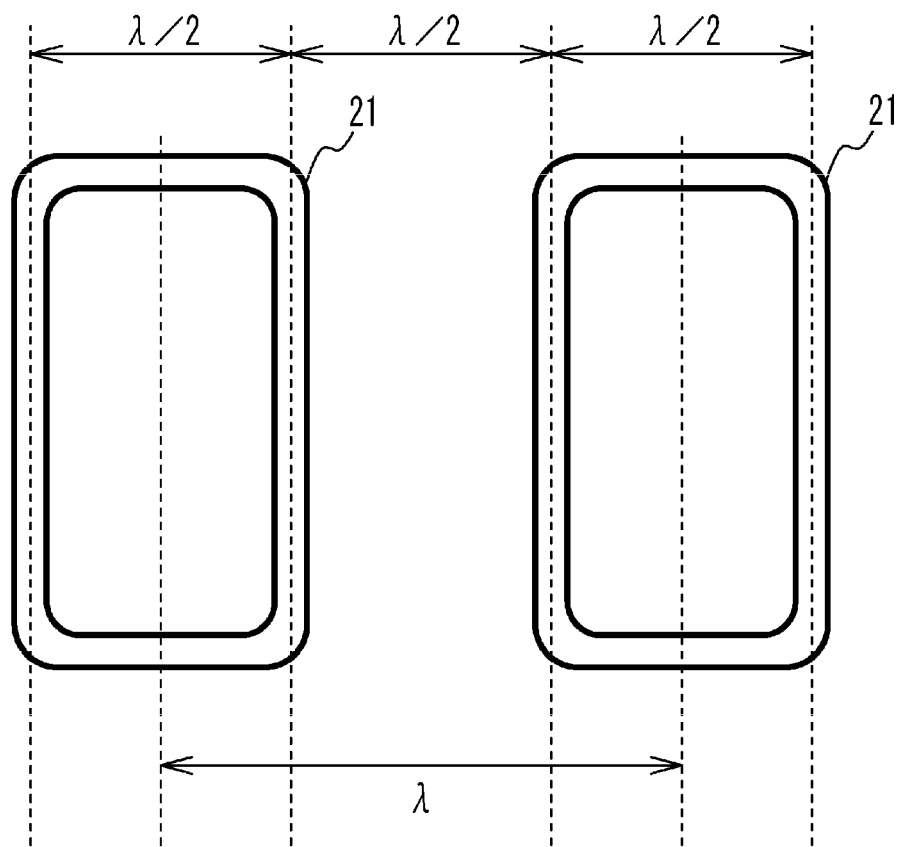
FIG. 3 illustrates a size of a connection coil.

For example, as illustrated in FIG. 3, the connection coils 21 have a size in which an interval between line width centers of the two connection coils 21 next to each other is λ/2. A signal period determined by a structure of the electromagnetic induction type encoder is rougher than that of a photoelectric type encoder. Therefore, a demand of the electromagnetic induction type encoder against interpolation accuracy is not high. However, recently, a demand of high accuracy is enhanced. With respect to the electromagnetic induction type encoder, the interpolation accuracy comparable to that of the photoelectric type encoder is demanded. It is important whether a signal caused by moving of the detection head has a sine wave shape without distortion or not, whether intensity of the signal is appropriate or not, whether fluctuation of the signal intensity is suppressed or not, in order to satisfy the demand. However, this point is not strictly considered.

Figure 4:
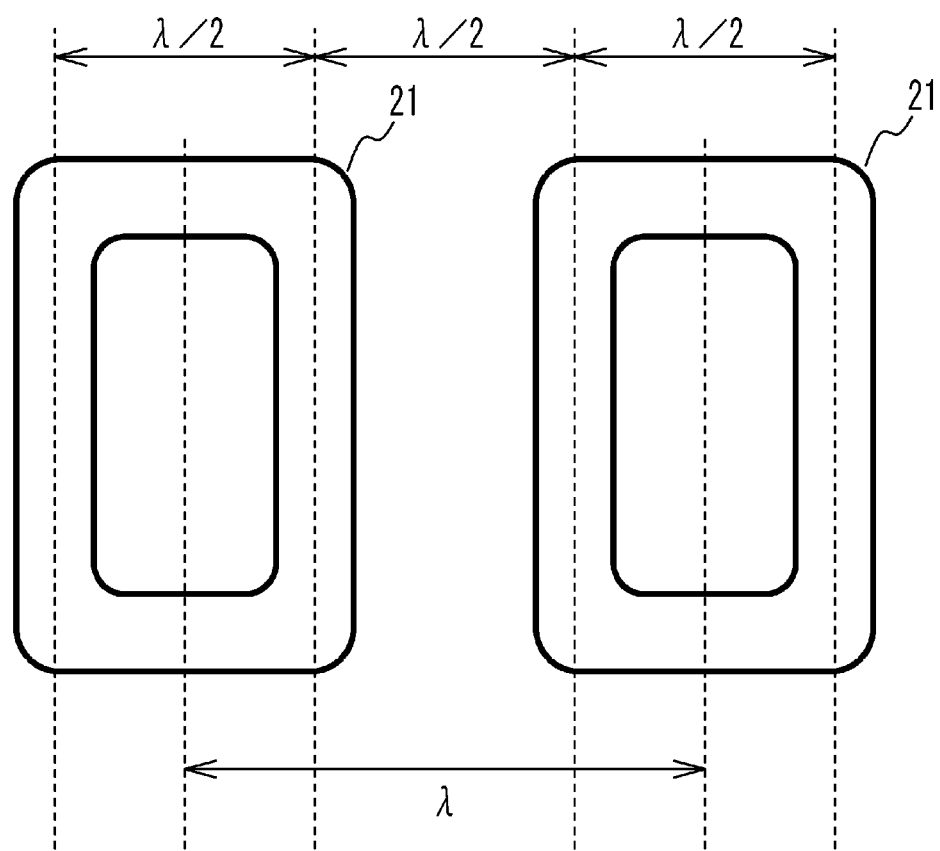
FIG. 4 illustrates a case where a line width of a connection coil is widened.

And so, for example, as illustrated in FIG. 4, the line width of the connection coil 21 is widened. Thereby, a resistance component of the coil is reduced. And, it is possible to increase the signal intensity. Moreover, it is possible to suppress the fluctuation of the signal intensity caused by defect of the coil that may occur in the manufacturing thereof. However, it is confirmed that when the line width is widened, an error of ⅓ period of the fundamental period λ (λ/3 error) of which correction is difficult increases and the interpolation accuracy is degraded. Therefore, it is difficult to achieve both the high measurement accuracy and securement of the signal intensity. The securement of the signal intensity includes largeness of an absolute value of the signal and suppression of the signal fluctuation.

Figure 5:
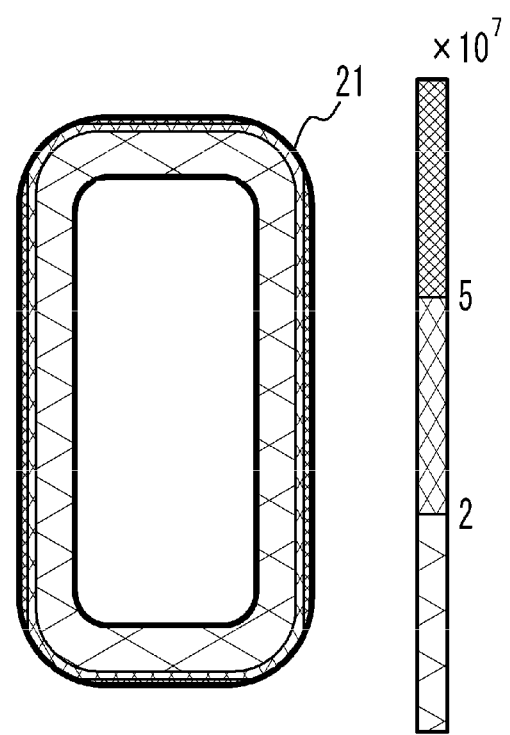
FIG. 5 illustrates a simulation result of current density of a connection coil.

The present inventors have found that the current density in the connection coil 21 is lower on an inner circumference side of the coil and is higher on an outer circumference side of the coil. FIG. 5 illustrates a simulation result of the current density of the connection coil 21. In FIG. 5, the deeper the pattern is, the higher than the current density is. A unit of values is $A/m^2$. From the result of FIG. 5, it is understood that the current density is low on the inner circumference side of the connection coil 21, and the current density is high on the outer circumference side of the connection coil 21. In this manner, in the line width direction of the connection coil 21, there is variation in the current density.

Figure 6:
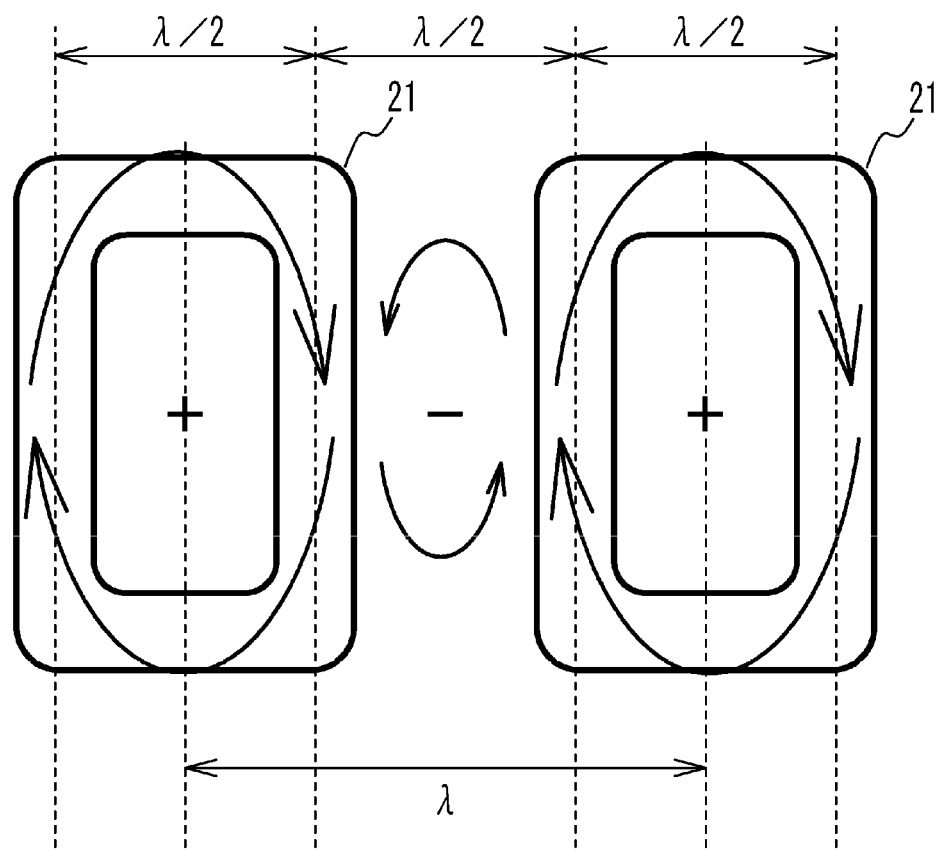
FIG. 6 illustrates magnetic field generated by a current flowing in an outer circumference.

When the line width of the connection coil 21 is widened in order to secure the signal intensity, a plus side region and a minus side region become unbalanced with respect to the magnetic field generated by the current flowing in the outer circumference of the coil, as illustrated in FIG. 6. And, the sine wave differs from a theoretical sine wave. Thereby, the interpolation accuracy may be degraded. The current density distribution is negligible when the line width is narrow. However, it is confirmed that the current density distribution is remarkable when the line width is increased. For example, the current distribution is remarkable in the connection coil 21 of which the line width is 200 μm or more.

Figure 7A:
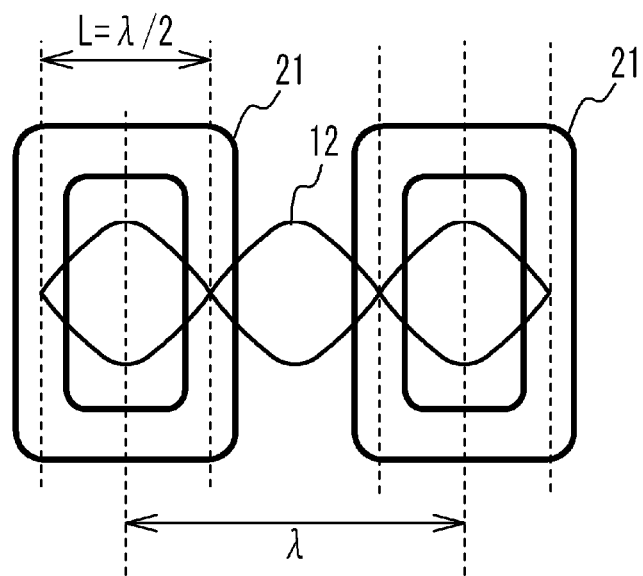
FIG. 7A and FIG. 7B illustrate a relationship between a line width of a connection coil and $\lambda/2$.
Figure 7B:
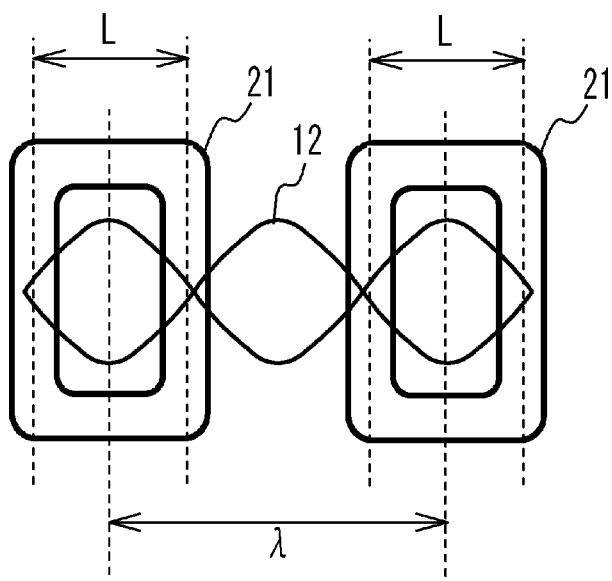
Figure 8A:
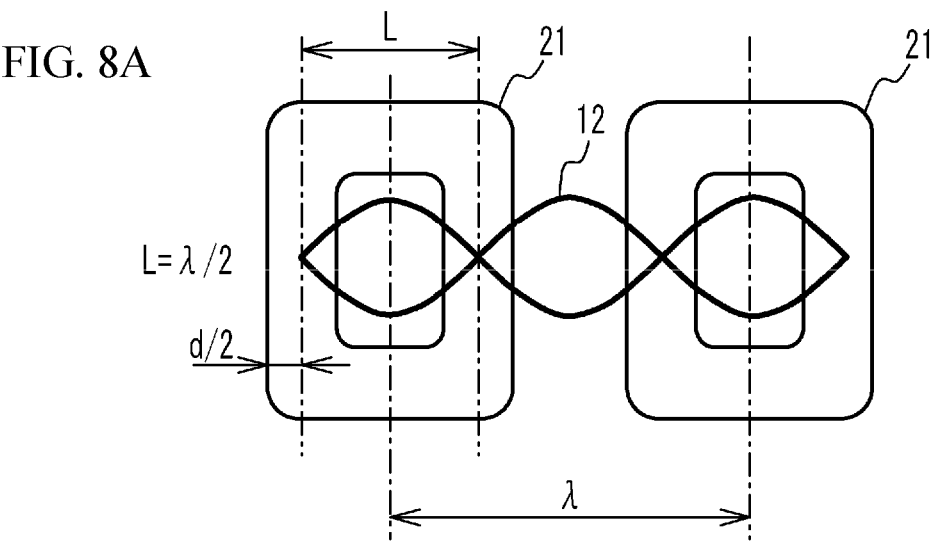
FIG. 8A to FIG. 8C illustrate a relationship between a line width of a connection coil and $\lambda/2$.
Figure 8B:
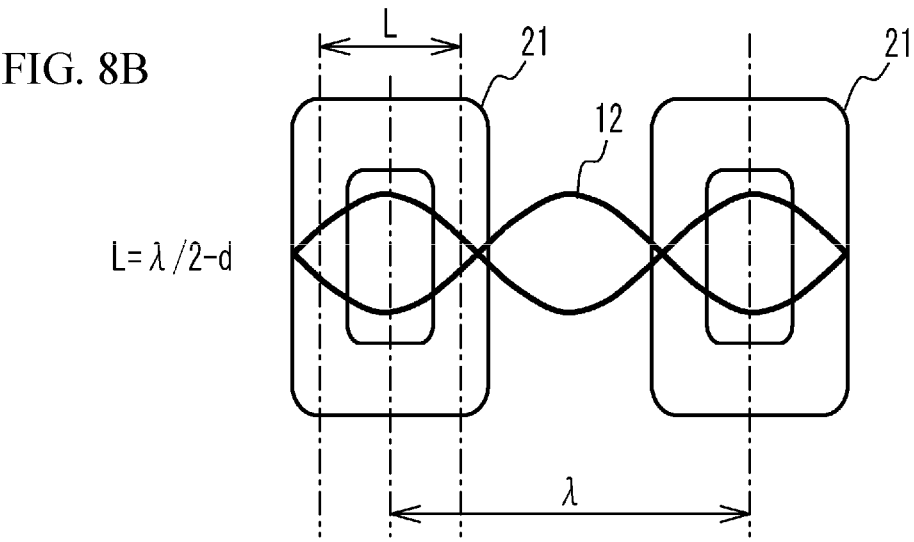
Figure 8C:
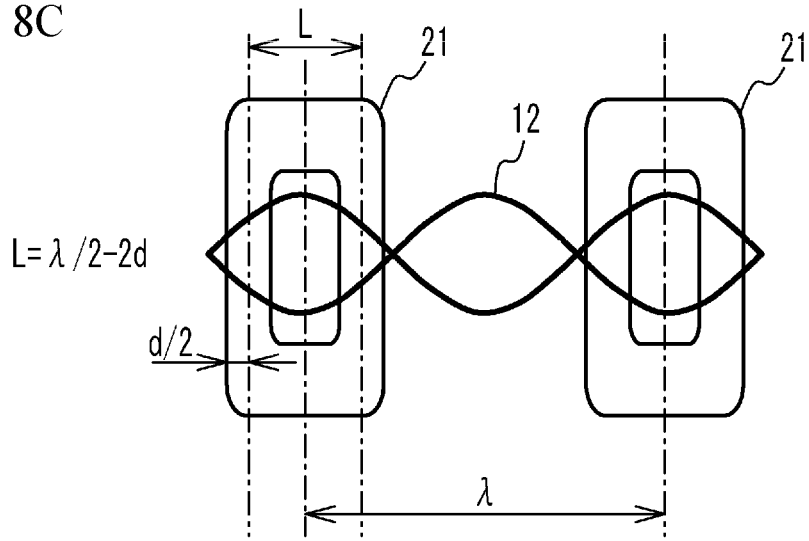

As illustrated in FIG. 7A, when an interval L between of the line width centers of the two connection coils 21 next to each other is λ/2, high interpolation accuracy may not be necessarily achieved. And so, as illustrated in FIG. 7B, it is preferable that an interval (>L) between coil edge portions where a current density is high is λ/2, in order to suppress influence of current density distribution. For example, it is preferable that edge portions of the receiver coils 12 arrayed in the fundamental period λ are positioned near the edge portions of the connection coils 21 where the current density is high. And so, in the embodiment, as illustrated in FIG. 8A to FIG. 8C, λ/2−2d<L<λ/2 is satisfied with respect to the period of the receiver coils=the interval of the connection coils=the signal period (the fundamental period λ), when a distance between a line width center and another line width center of a single connection coil 21 is "L" and a line width of the connection coils is "d". With the structure, the interval between the coil edge portions where the current density is high is $\lambda/2$ or near $\lambda/2$. In this case, the degradation of the interpolation accuracy is suppressed. And high measurement accuracy is achieved. Moreover, it is possible to widen the line width of the connection coils 21. It is therefore possible to increase the signal intensity. Accordingly, it is possible to achieve both the high measurement accuracy and the securement of the signal intensity. It is preferable that $\lambda/2-3d/2<L<\lambda/2-d/2$ is satisfied, in order to achieve higher interpolation accuracy.

Figure 9A:
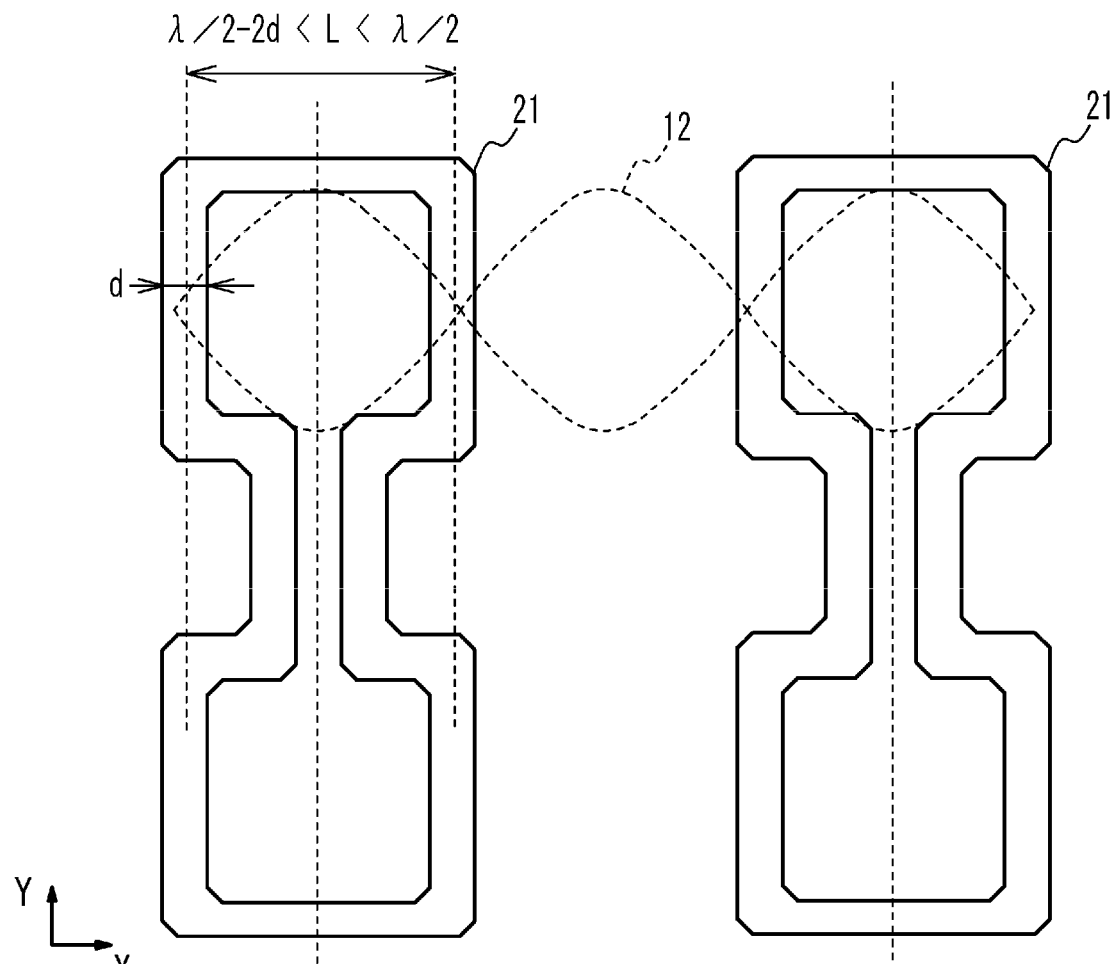
FIG. 9A and FIG. 9B illustrate another shape of a connection coil.
Figure 9B:
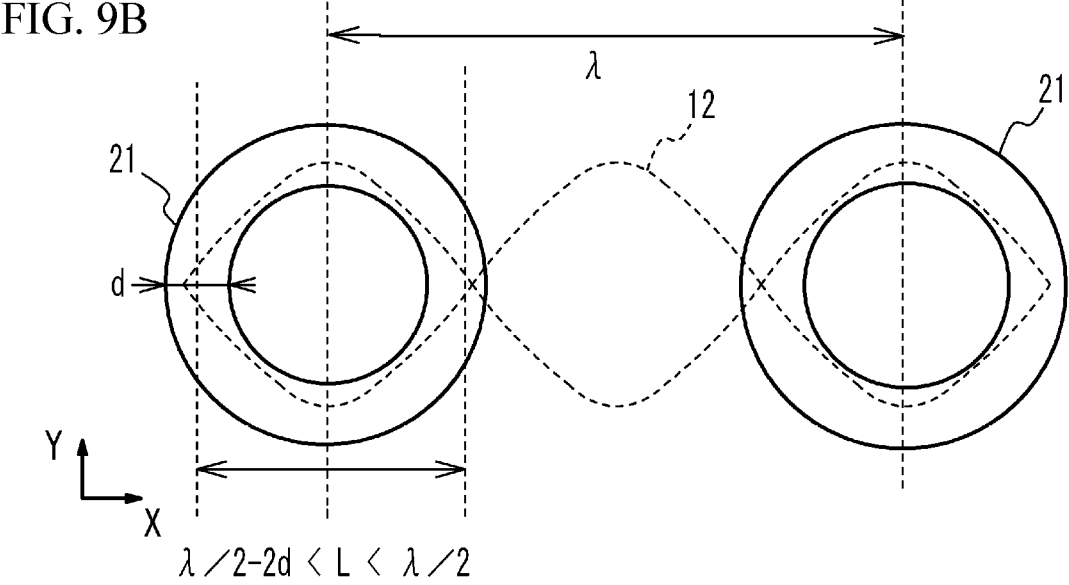

In the embodiment, the connection coils 21 have a rectangular shape. However, the connection coils 21 may have other shapes. For example, as illustrated in FIG. 9A, the connection coils 21 may be closed coils having a shape of a FIG. 8. Alternatively, as illustrated in FIG. 9B, the connection coils 21 may be closed coils having a circular shape. In the closed loop coils, the current density on the external circumference side of the coils is higher than that on the inner circumference side of the coils. And so, in a portion of the connection coil 21 that is electromagnetically coupled with the receiver coil 12, $\lambda/2-2d<L<\lambda/2$ is satisfied when a maximum distance between the line width centers in the X-axis direction is "L" and the line width of the connection coil 21 is "d". With the structure, the interval between the coil edge portions where the current density is high is $\lambda/2$ or near $\lambda/2$. Thus, the degradation of the interpolation accuracy is suppressed, and high measurement accuracy is achieved. It is preferable that $\lambda/2-3d/2<L<\lambda/2-d/2$ is satisfied in order to achieve higher interpolation accuracy. It is preferable that the connection coils 21 have a shape which is linearly symmetrical with respect to the Y-axis.

Figure 10A:
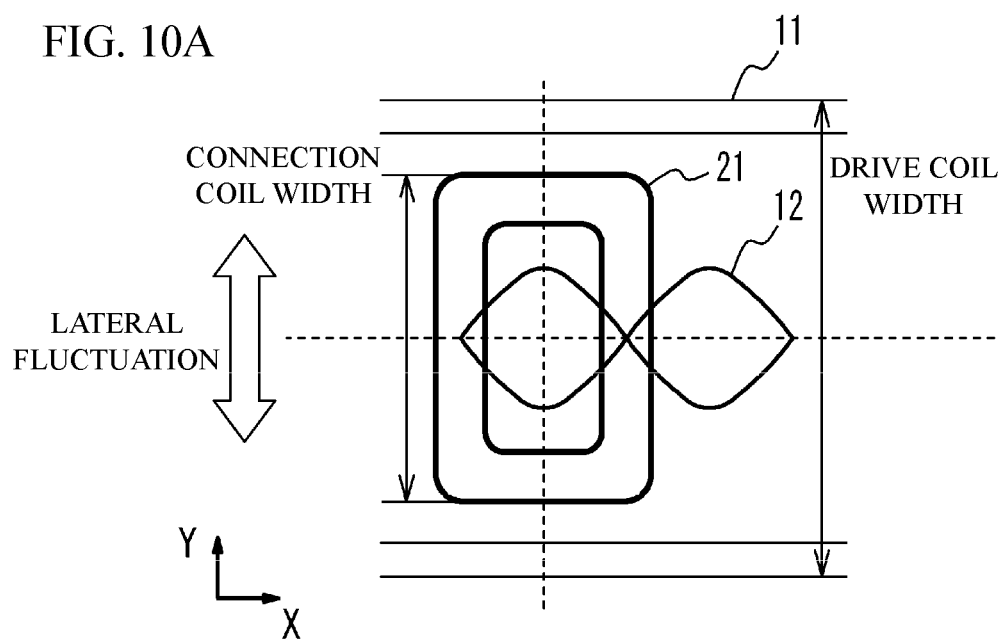
FIG. 10A and FIG. 10B illustrate a relationship between a width of a connection coil and a width of a drive coil.
Figure 10B:
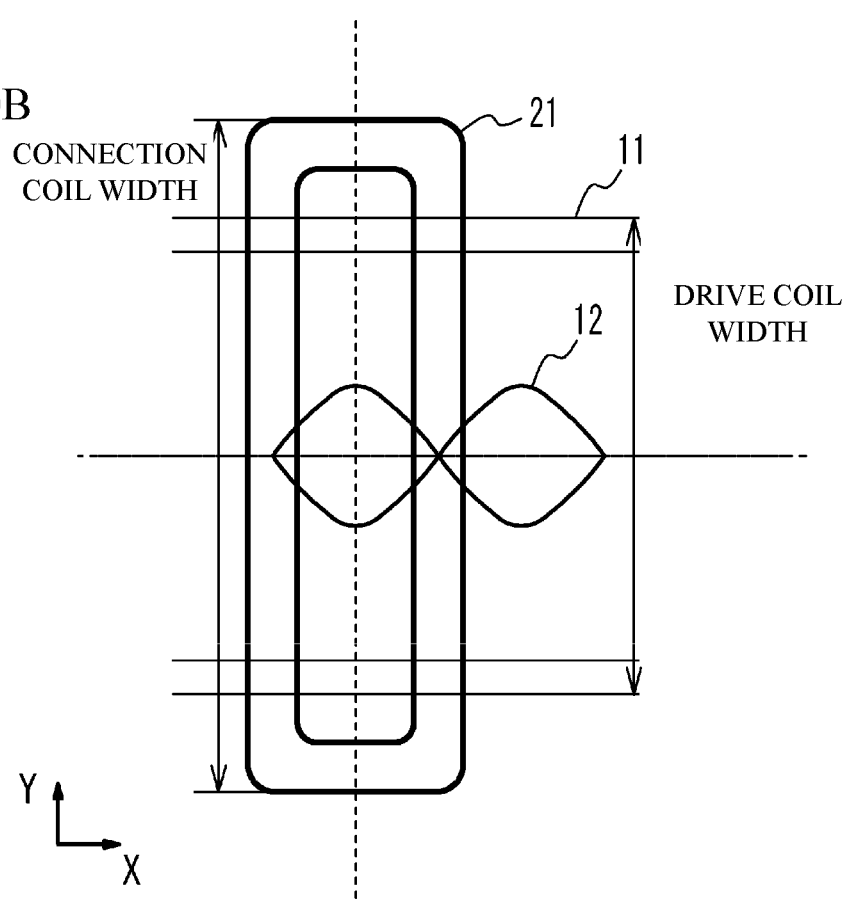
Figure 11A:
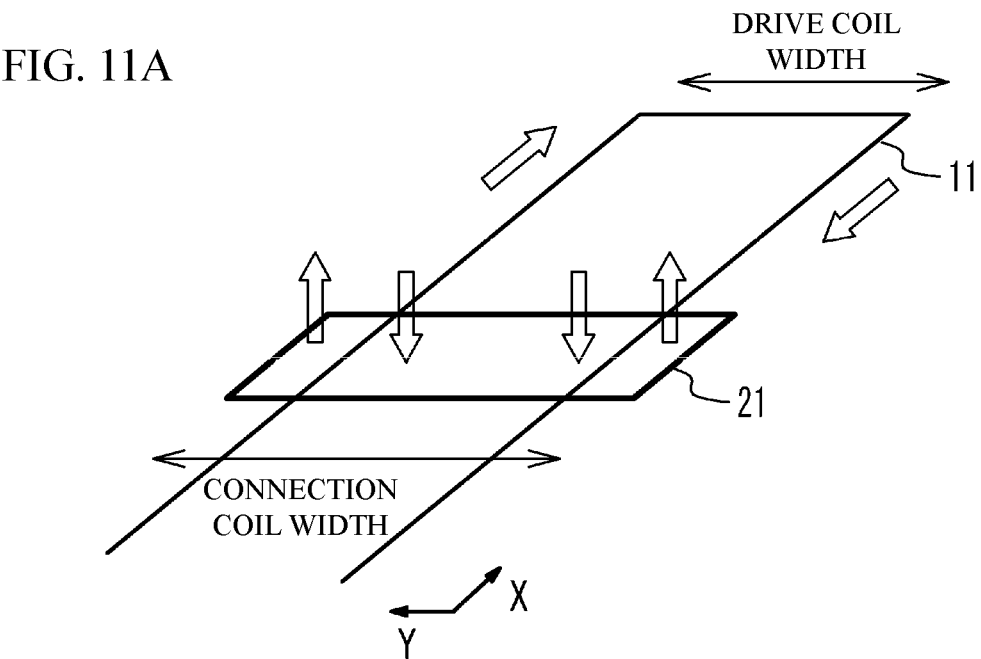
FIG. 11A and FIG. 11B illustrate a relationship between a width of a connection coil and a width of a drive coil.
Figure 11B:
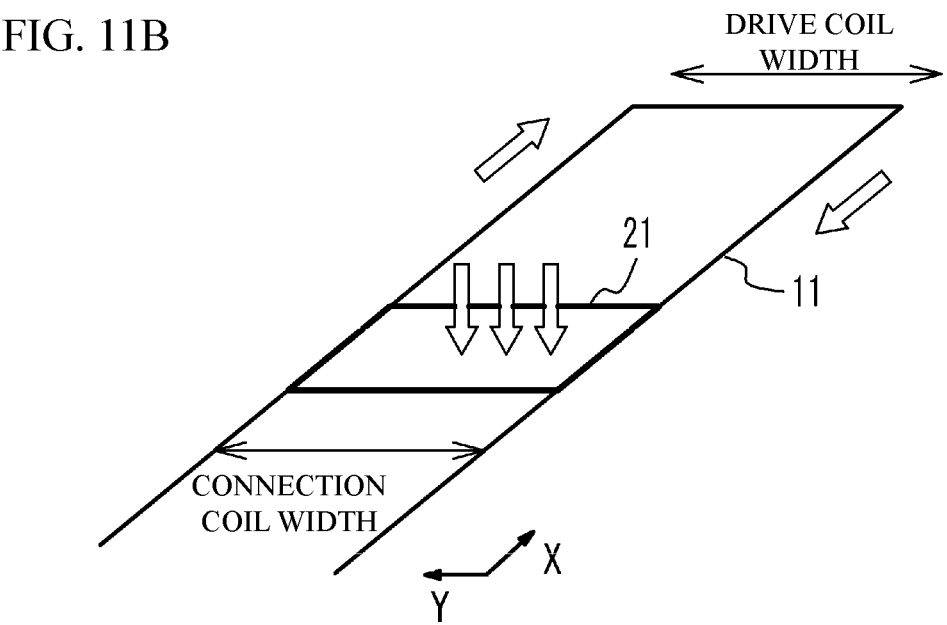

Next, a description will be given of a relationship between the position of the drive coil 11 of the detection head 10 and the position of the connection coil 21 of the scale 20. It is advantageous that the width of the connection coil 21 in the Y-axis direction is widened as much as possible as illustrated in FIG. 10B when the position fluctuation of the receiver coil 12 is considered, in order to increase an allowed amount of relative lateral fluctuation between the position of the detection head 10 and the position of the scale 20 as illustrated in FIG. 10A. However, as illustrated in FIG. 11A, when the connection coil 21 extends outside of the drive coil 11, the extension portions cancel the magnetic field of the drive coil 11. Therefore, the signal intensity is reduced. And so, as illustrated in FIG. 11B, it is preferable that the width of the connection coil 21 in the Y-axis direction is equal to or less than the width of the drive coil 11 in the Y-axis direction, in order to secure the signal intensity.

Modified Embodiment

Figure 12:
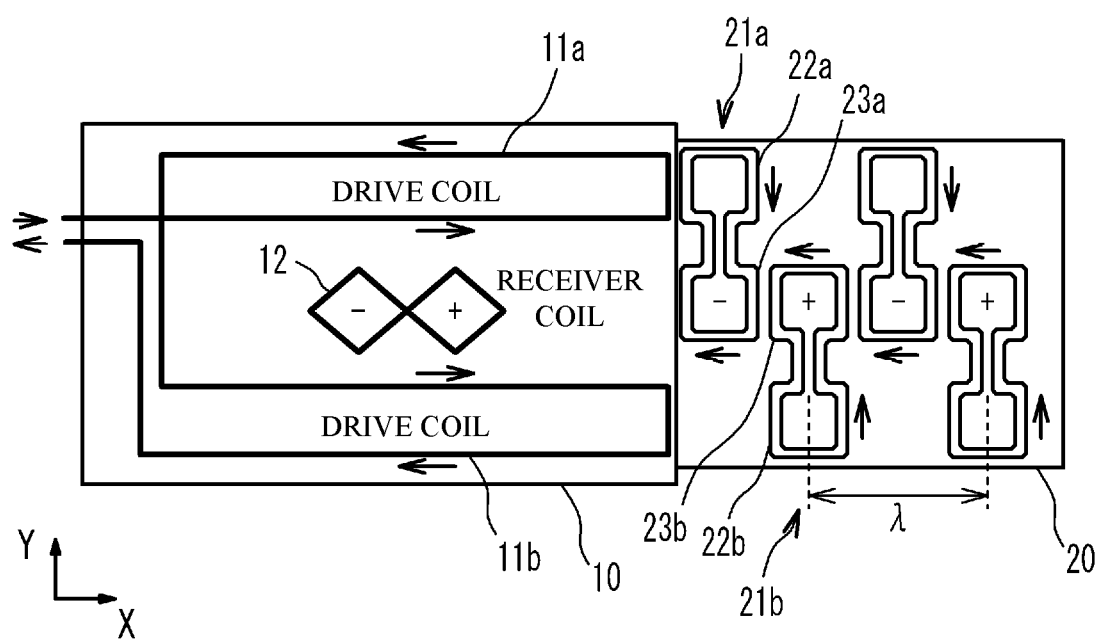
FIG. 12 illustrates a modified embodiment.

In the example of FIG. 1, the receiver coils 12 are inside of the drive coil 11. However, the structure is not limited. FIG. 12 illustrates another example where the receiver coils 12 are not inside of the drive coil 11. For example, as illustrated in FIG. 12, the drive coil 11 has a pair of a drive coil 11a and a drive coil 11b. The receiver coil 12 is arranged between the drive coil 11a and the drive coil 11b.

The drive coils 11a and 11b are rectangular patterns extending in the X-axis direction. For example, the drive coils 11a and 11b are connected so that a current flowing in the drive coil 11a is opposite to that in the drive coil 11b. For example, the current flows counterclockwise in the drive coil 11a, and the current flows clockwise in the drive coil 11b.

In the scale 20, a connection coil 21a and a connection coil 21b are alternately arrayed. The connection coils 21a are closed loop coils that are arrayed in the fundamental period $\lambda$. And the connection coils 21a have a first loop portion 22a electromagnetically coupled with the drive coil 11a and a second loop portion 23a electromagnetically coupled with the receiver coil 12. The connection coils 21b are closed loop coils of which a phase is different from that of the connection coil 21a by 180 degrees. And the connection coils 21b have a first loop portion 22b electromagnetically coupled with the drive coil 11b and a second loop portion 23b electromagnetically coupled with the receiver coil 12. In the modified embodiment, the connection coils 21a and the connection coils 21b are arrayed in the fundamental period $\lambda/2$.

Figure 13A:
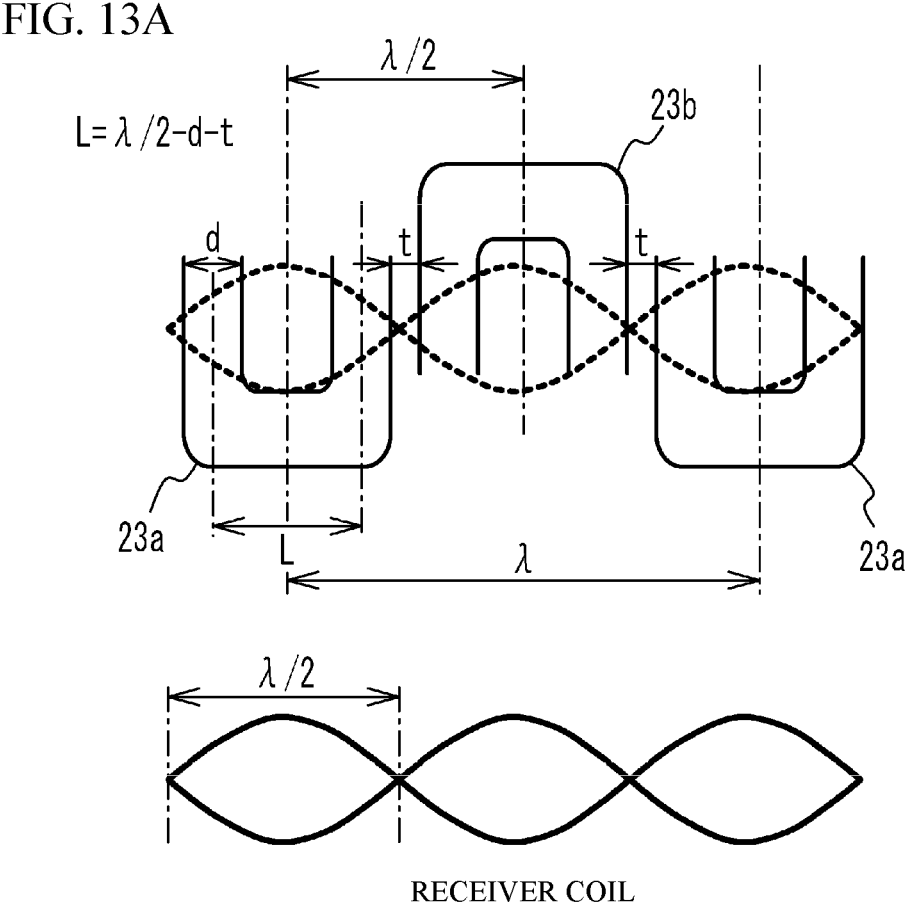
FIG. 13A and FIG. 13B illustrate a relationship between a line width of a connection coil and $\lambda/2$.
Figure 13B:
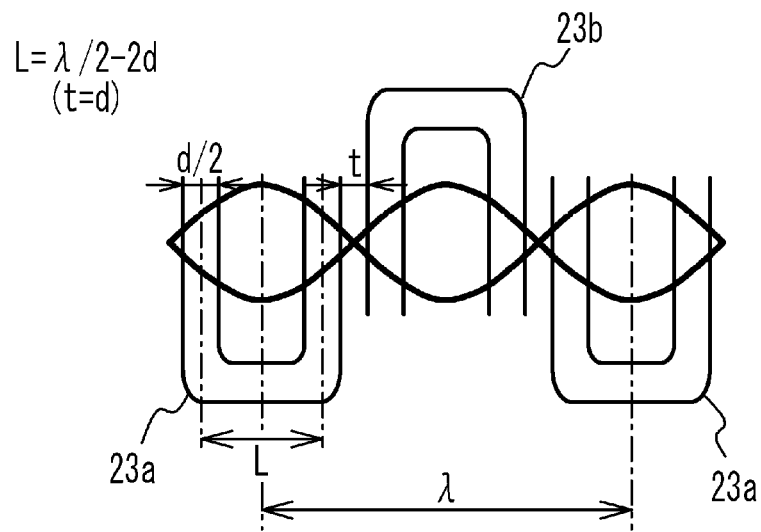

In the structure, an edge of the connection coil 21a and an edge of the connection coil 21b contact to each other, when $L=\lambda/2$ is satisfied. In this case, a maximum distance between the line width centers in the X-axis direction is "L" and the line width of the connection coils 21a and 21b is "d" in portions of the connection coils 21a and 21b that are electromagnetically coupled with the receiver coil 12. And so, in the modified embodiment, as illustrated in FIG. 13A, an interval t between the connection coil 21a and the connection coil 21b is considered. And $L<\lambda/2$ is satisfied. In concrete, $L+d+t=\lambda/2$ is satisfied. And, when "L" is widened as much as possible, t is 0. "L" becomes minimum when $t=d$ is satisfied as illustrated in FIG. 13B. Therefore, $\lambda/2-2d<L<\lambda/2-d$ is satisfied. In the structure, the interval between the coil edge portions where the current density is high is $\lambda/2$ or near $\lambda/2$. Thus, the degradation of the interpolation accuracy is suppressed. And high measurement accuracy is achieved. Moreover, it is preferable that $\lambda/2-3d/2<L<\lambda/2-d$ is satisfied in order to achieve higher interpolation accuracy.

The present invention is not limited to the specifically disclosed embodiments and variations but may include other embodiments and variations without departing from the scope of the present invention.

What is claimed is:

1. An electromagnetic induction type encoder comprising:
   a detection head that has a rectangular shape; and
   a scale that has a rectangular shape,
   wherein the detection head faces with the scale and is configured to relatively move with respect to the scale in a measurement axis direction,
   wherein the detection head has a drive coil configured to generate magnetic flux,
   wherein the scale has a plurality of connection coils that are arrayed in a fundamental period $\lambda$ in the measurement axis direction, are configured to be electromagnetically coupled with the magnetic flux generated by the drive coil and generate magnetic flux that fluctuates in a predetermined spatial period in the measurement axis direction,
   wherein the detection head has a plurality of receiver coils that are arrayed in the fundamental period $\lambda$ in the measurement axis direction and are configured to be electromagnetically coupled with the magnetic flux generated by the plurality of connection coils and detect a phase of the magnetic flux,
   wherein $\lambda/2-2d<L<\lambda/2$ is satisfied when a distance between a line width center and another line width center of the plurality of connection coils in the measurement axis direction is "L" and a line width of the plurality of connection coils is "d".

2. The electromagnetic induction type encoder as claimed in claim 1, wherein a width of the plurality of connection coils in a direction perpendicular to the measurement axis direction in a plane formed by the scale is equal to or less than a width of the drive coil in the direction perpendicular to the measurement axis direction.

3. The electromagnetic induction type encoder as claimed in claim 1, wherein the plurality of connection coils have a shape that is linearly symmetric with an axis perpendicular to the measurement axis direction in a plane formed by the scale.

4. The electromagnetic induction type encoder as claimed in claim 3, wherein the plurality of connection coils have a rectangular shape.

5. The electromagnetic induction type encoder as claimed in claim 1, wherein the line width "d" of the plurality of connection coils is 200 μm or more.

* * * * *